July 10, 1934. G. MORGAN 1,965,985
COMBINED HITCHING AND POWER TAKE-OFF MECHANISM
Original Filed Oct. 26, 1926  6 Sheets-Sheet 1
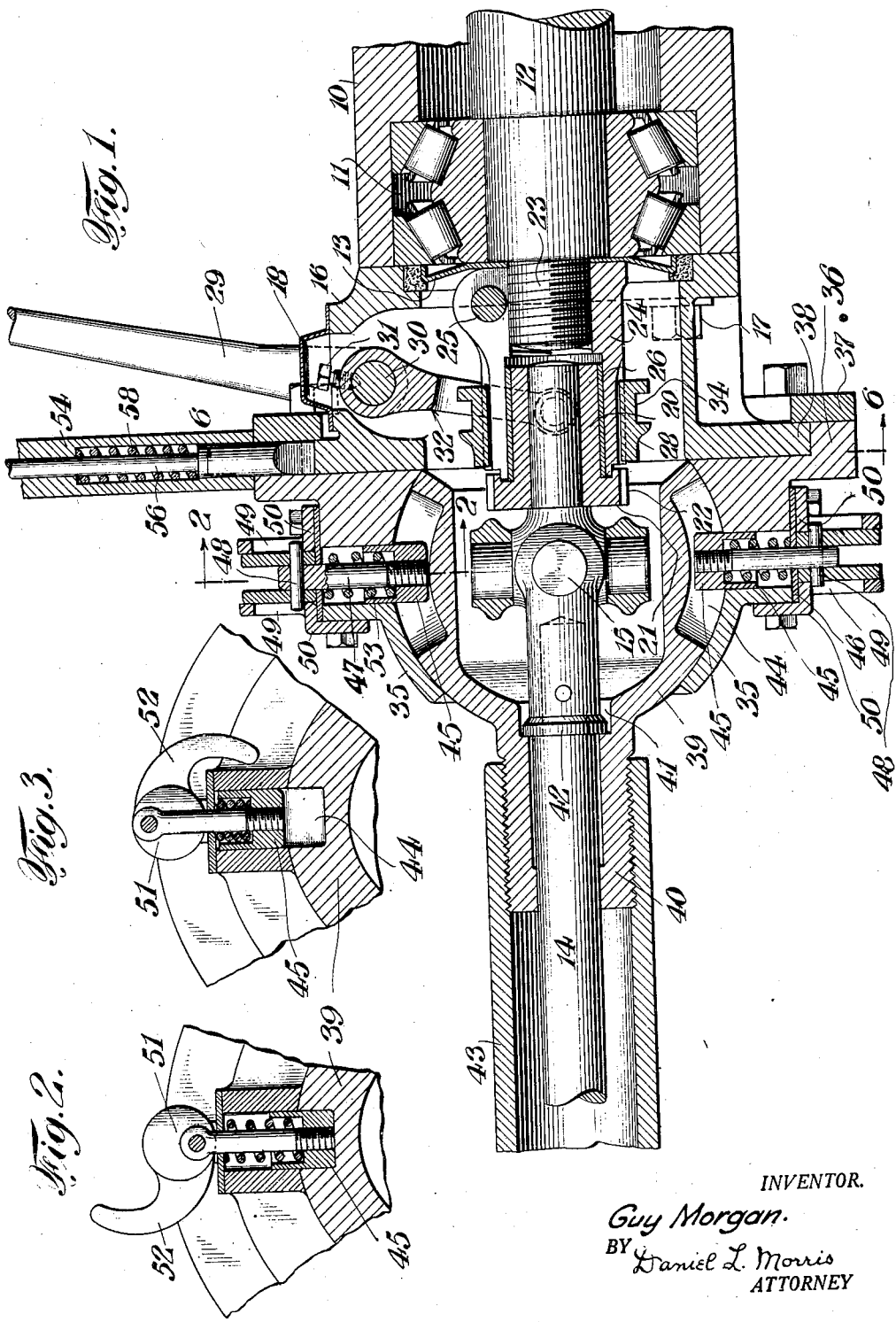
INVENTOR.
Guy Morgan.
BY Daniel L. Morris
ATTORNEY

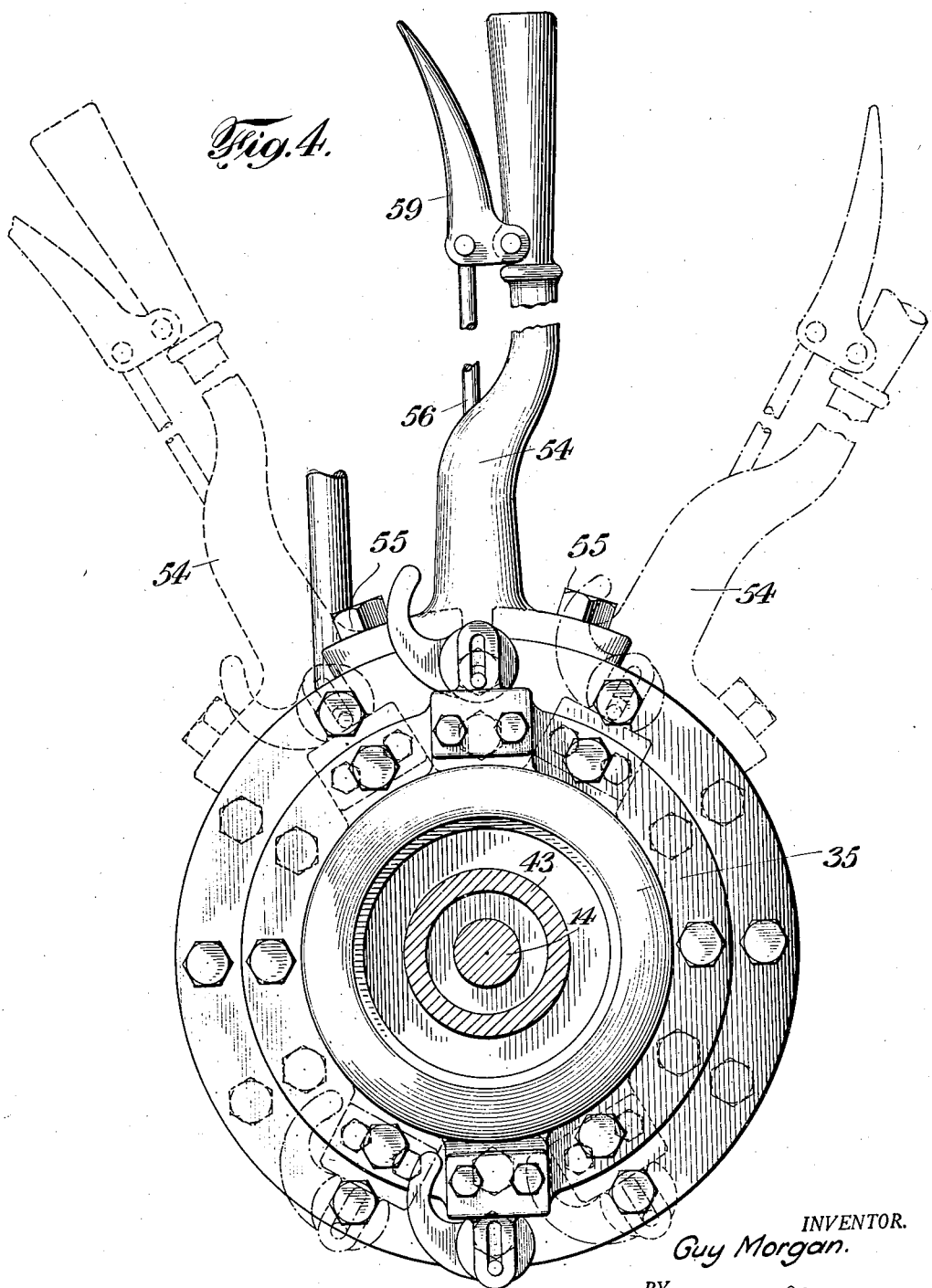

July 10, 1934.  G. MORGAN  1,965,985

COMBINED HITCHING AND POWER TAKE-OFF MECHANISM

Original Filed Oct. 26, 1926  6 Sheets-Sheet 3

INVENTOR.
Guy Morgan
BY Daniel L. Morris
ATTORNEY

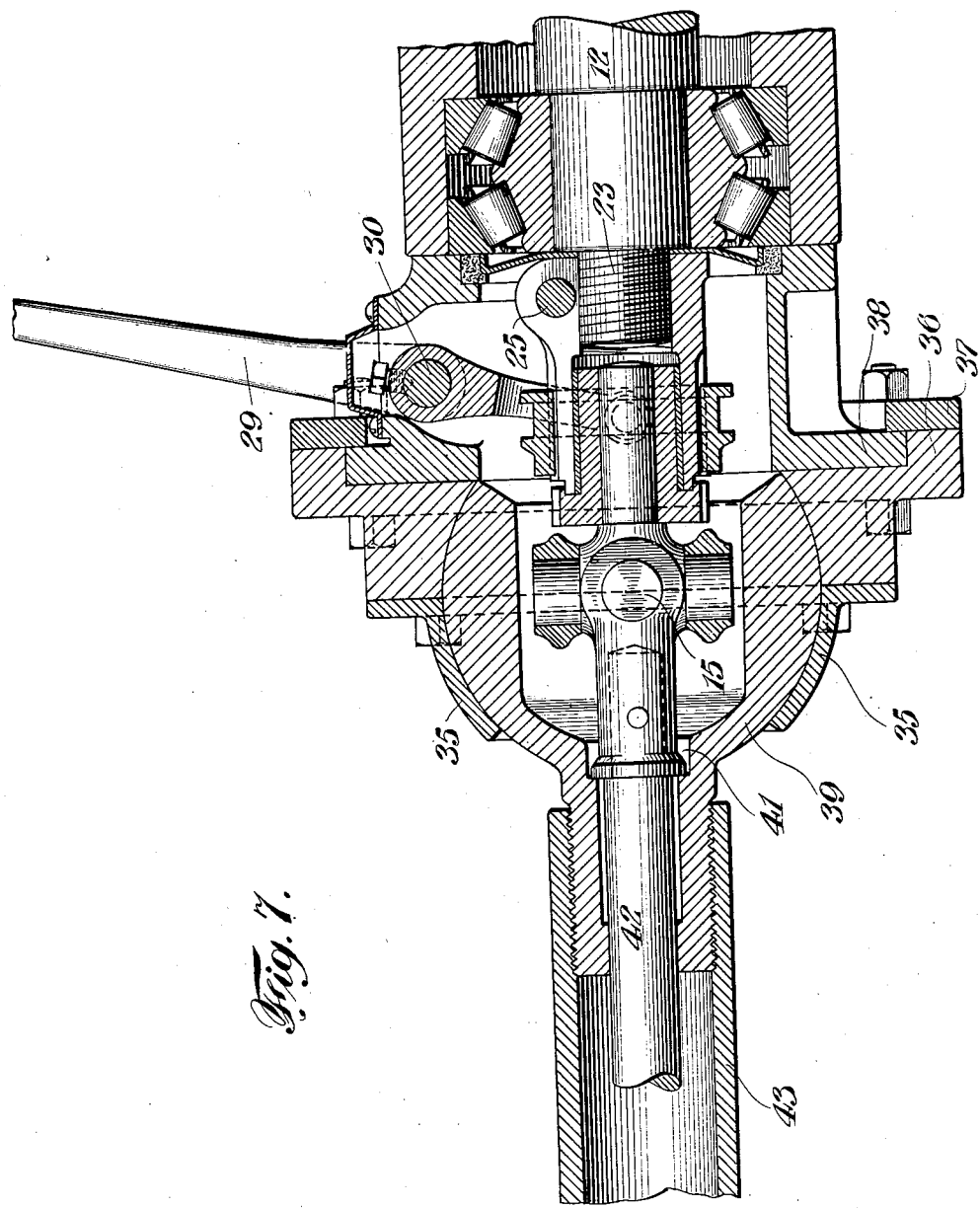

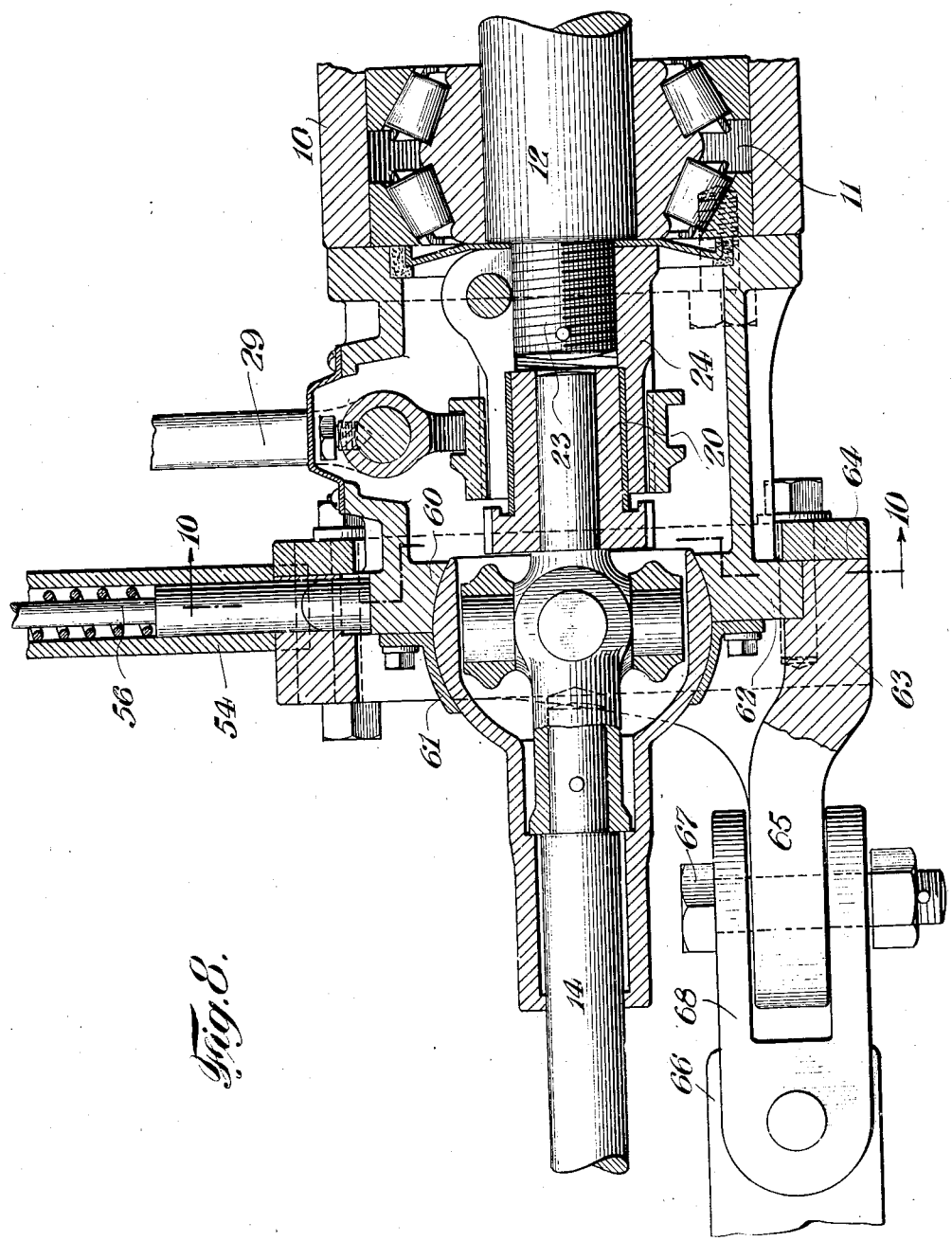

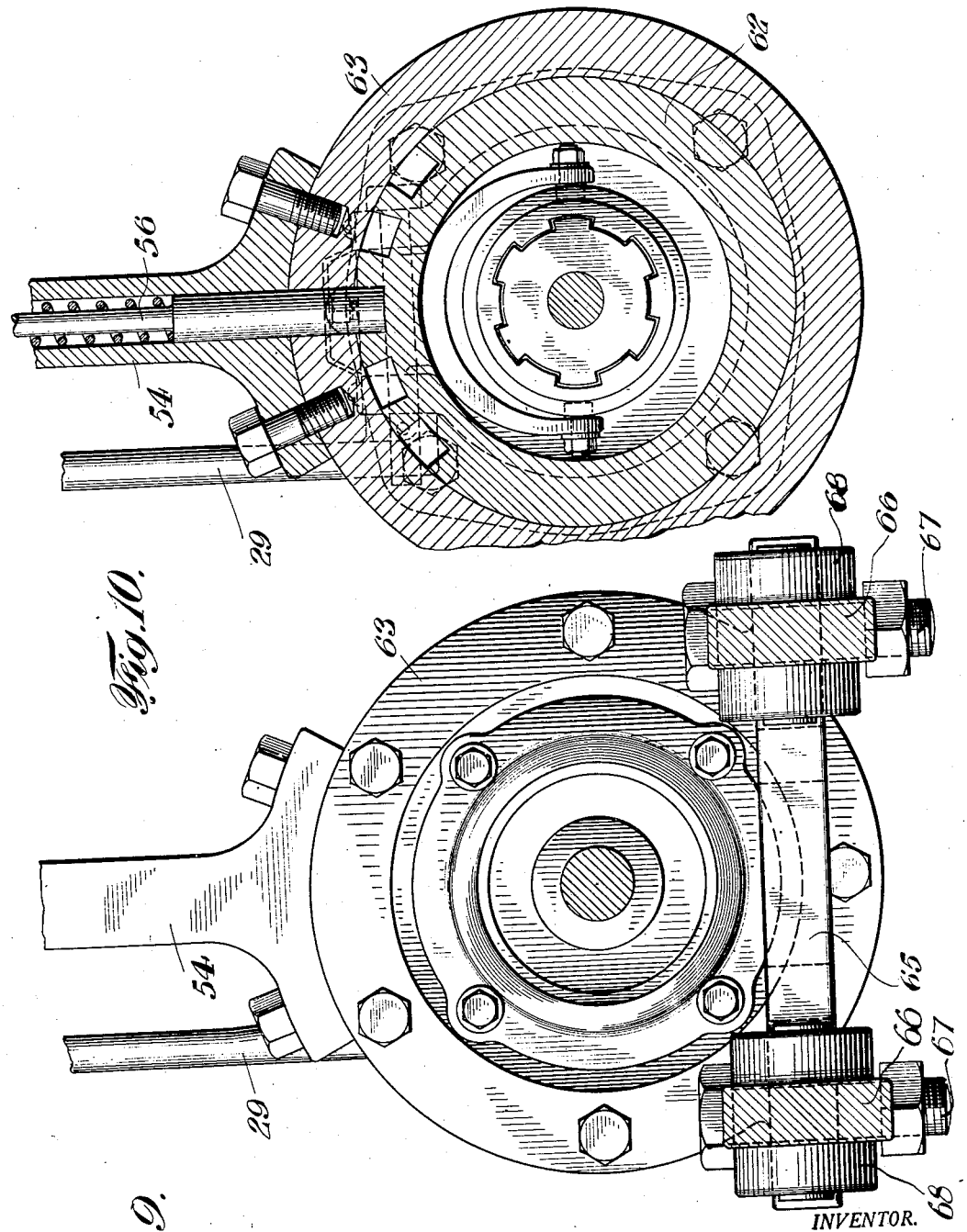

Patented July 10, 1934

1,965,985

UNITED STATES PATENT OFFICE

1,965,985

COMBINED HITCHING AND POWER TAKE-OFF MECHANISM

Guy Morgan, New York, N. Y., assignor to The Warford Corporation, New York, N. Y., a corporation of New York Continuation of application Serial No. 144,388, October 26, 1926. This application March 28, 1931, Serial No. 525,887

12 Claims. (Cl. 180—14)

The present invention broadly consists in the provision of a mechanism which embodies the combination of means for coupling the motive power of a tractor to a vehicle or implement with means for transmitting the motion of the tractor to the vehicle or implement by a direct application of force.

There are many machines, particularly in the art of agriculture, which are adapted to be driven by a tractor. A well known example is the plow. In the case of this implement hitching connections only are desired which will transmit the motion of the tractor to the plow by direct pull or draw. There are other machines, however, designed to be driven by a tractor and carrying apparatus of various sorts which are to be power-driven. In the case of such a machine, it is desired to provide not only hitching connections by which the machine may be drawn by the tractor, but it is also desired to couple the motive power of the tractor to the machine and to utilize the same in driving the agricultural or other power-driven apparatus carried by the machine.

The present invention aims to provide in a single mechanism force transmitting connections for communicating the motion of the tractor to a vehicle or implement and power transmitting connections which serve to couple the motive power of the tractor to the vehicle or implement whereby apparatus carried by the vehicle or implement may be driven by the motive power of the tractor. The invention also embodies means for relieving the power transmitting means of all longitudinal strain, for the latter generally includes a universal joint which is ill adapted to withstand such strain. The invention also includes a clutch operable by a simple manual manipulation which serves to render the power transmitting means operative or inoperative as desired. This permits the mechanism to be used as a force transmitting means only and adapts the same for use with tractor-driven machines of all sorts, whether they carry power-driven apparatus or not.

The invention also involves the provision of a mechanism as above described in which the tractive force is transmitted through a flexible connection which permits free angular motion of the driven machine with respect to the tractor and further comprises means whereby this flexible connection may be altered so that the driven machine is maintained at a fixed angle of incline while in motion and means whereby the angle of incline may be changed.

While a mechanism embodying the present invention in its preferred form comprises all of the above enumerated elements, the invention is not to be considered as limited thereto for it involves also improvements in the elements of the mechanism which may be used separately and individually and in combinations less than the whole.

For a clearer understanding of the invention, reference will now be had to the accompanying drawings forming a part of this specification and which disclose several constructional forms of the invention.

In the drawings:

Figure 1 is a sectional elevational view of a mechanism embodying the present invention.

Figure 2 is a sectional view on the line 2—2 of Figure 1, illustrating a detail of the mechanism;

Figure 3 is a view similar to Figure 2, but showing the detail in a different position;

Figure 4 is an elevational view of the mechanism looking from the left of Figure 1;

Figure 7 is a sectional elevational view of a modified form of the invention;

Figure 8 is a sectional elevational view of another modified form of the invention;

Figure 9 is an elevational view of this modification looking from the left of Figure 8; and Figure 10 is a sectional view on the line 10—10 of Figure 8.

Figure 5:
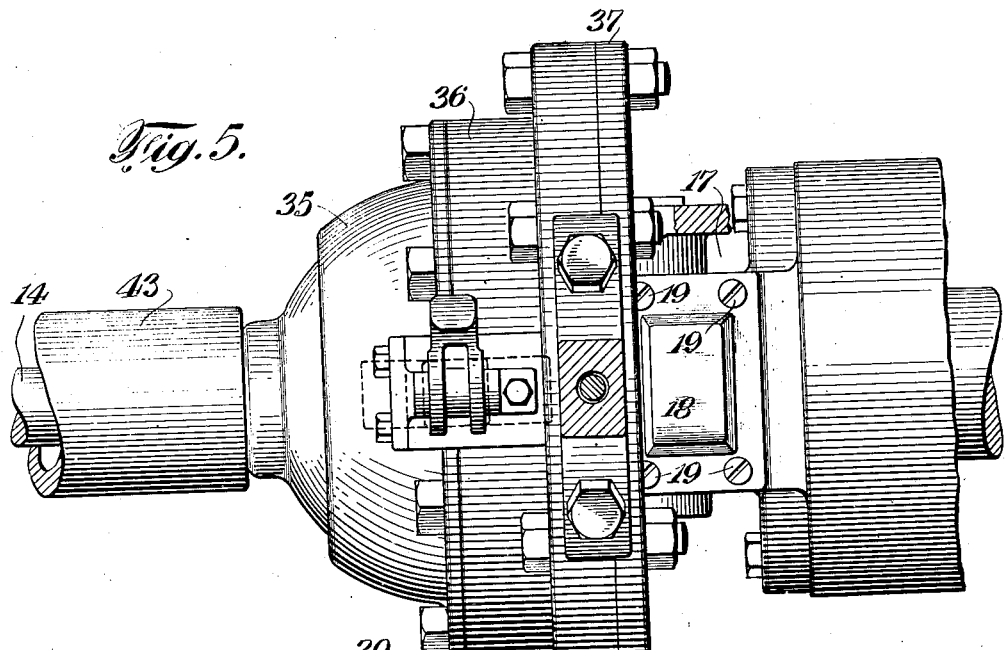
Figure 5 is a top or plan view of the mechanism.

Turning now to a more detailed consideration of the drawings, in which the same reference numerals denote the same parts throughout the different views, in the modification shown in Figures 1 to 6, the reference numeral, 10, indicates a hollow member attached to the tractor and containing a bearing, 11, for a rotating shaft, 12. The bearing is shown as a roller bearing of a well-known type and the shaft has a journal, which rotates in the bearing. The shaft also, preferably has a disc, 13, which serves to retain oil within the bearing. Rotary motion is imparted to the shaft by the motive power of the tractor, the power being communicated from the shaft 12 to the machine to which the tractor is hitched through a shaft, 14. The latter shaft is provided with a universal joint, 15, of conventional character, which permits angular movement of the shaft, 14, while still rotating, with respect to the tractor.

Figure 6:
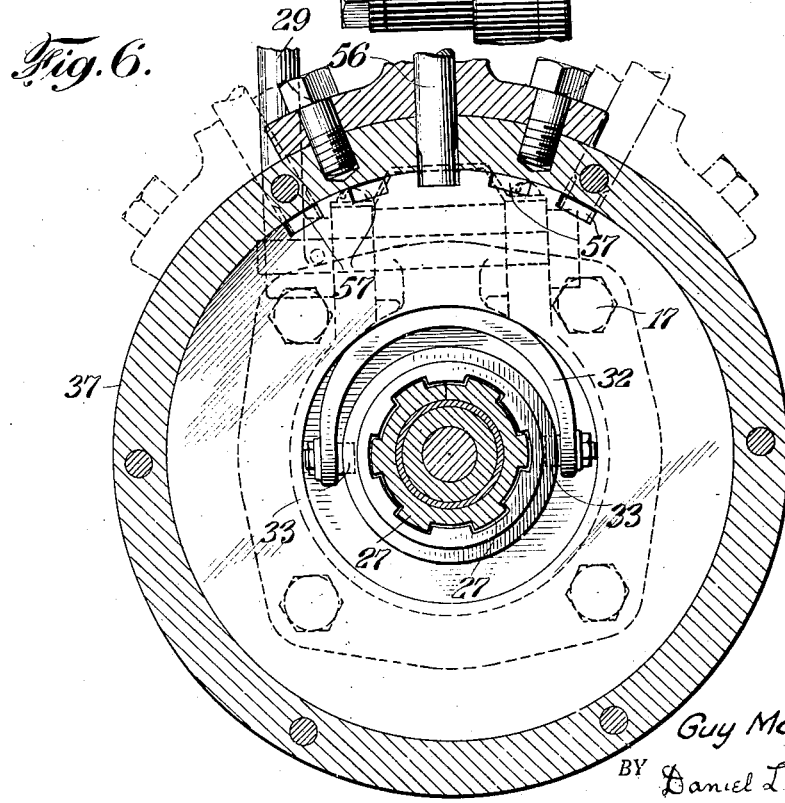
Figure 6 is a sectional view on the line 6—6 of Figure 1.

Means are provided for operatively connecting or disconnecting the shafts, 12 and 14. This means takes the form of a clutch, the elements of which are located within a housing, 16, clamped to the member, 10, as by bolts, 17. The housing preferably has a removable top, 18, detachably secured in place as by set-screws, 19. For purposes of inspection or repair ingress may be had to the interior of the housing by removing the top without necessitating the disassembly of the mechanism. The type of clutch disclosed includes a tubular member, 20, encircling the end of the shaft, 14, and held in non-rotatable engagement therewith. The end of the tube nearest the universal joint has an enlarged portion, 21, with teeth, 22, extending around its periphery. The shaft, 12, is provided with a reduced end, 23, which projects within the housing, 16. A sleeve, 24, is adapted to be placed over the reduced end, 23, and to rotate with the shaft, 12. Various expedients may be employed to insure a rigid association of the sleeve with the shaft. In the embodiment disclosed, the interior of the sleeve is of a diameter slightly less than that of the reduced end, 23, and it is preferably split so that it may be expanded and threaded on the reduced end, which results in an intimate engagement of the sleeve with the reduced end. To augment the efficiency of this connection, a bolt, 25, indicated in cross-section in Figure 1, may be used to clamp the split portions of the sleeve together. Other means, such as a set-screw, may, of course, be employed to attach the sleeve to the shaft. The sleeve extends over the exterior of the tube, 20, throughout most of the length thereof, and its exterior diameter is substantially the same as that of the enlarged portion of the tube. A bushing, 26, of soft metal is preferably inserted between the sleeve and the tube to prevent them from freezing or binding. The outer surface of the sleeve is provided with teeth, 27, similar to the teeth, 22, on the tube. A sliding collar, 28, encircles the sleeve, said collar being provided with interior grooves into which the teeth on the sleeve extend, as best shown in Figure 6. The collar may be slid over the enlarged portion of the tube in which case the teeth, 22, of the tube, as well as the teeth, 27, of the sleeve, fit in the grooves, and the collar operatively connects the sleeve and the tube, thus communicating the rotation of the shaft, 12, to the shaft, 14.

The means for moving the collar to operatively connect or disconnect the shafts comprise a lever, 29, rigidly secured to a shaft, 30, mounted in the housing, 16. Secured to the shaft, 30, as by a set-screw, 31, is a fork, 32, provided with pins, 33, which extend into a circumferential slot, 34, on the exterior of the collar. A slot of this character is necessary because the collar is continuously rotating with the shaft, 12. The lever may be grasped by the hand and rocked to cause the fork to rock and move the collar either to connect or disconnect the shafts.

The hitching or force transmitting part of the mechanism under consideration includes a ball and socket joint which also serves to house the power transmitting parts of the mechanism. The socket portion of the joint is composed of three parts, 35, 36, and 37. These parts are rigidly bolted together as shown best in Figure 5. The socket is attached to the housing, 16, by a tongue and groove connection comprising a circular flange, 38, on the housing which fits into a groove formed by the parts, 36 and 37, of the socket. This tongue and groove connection permits the socket to be rotated relative to the housing. The ball portion of the joint comprises a spherical member, 39, which is hollow and serves as a housing for the shaft, 14, and the universal joint, 15, which extend through it. The ball may be inserted in the socket when the part, 35, of the socket is disconnected. After the ball has been inserted in the socket the part, 35, is bolted back in place and serves to retain the ball within the socket. The ball has a neck, 40, extending a short distance along the shaft, 14. The neck is preferably counterbored, at 41, to provide a seat for an abutment, 42, on the shaft. The counterbore and the abutment serve to relieve the universal joint, 15, of any longitudinal strain to which the shaft, 14, might be subjected. A pipe or tube, 43, is threadedly attached to the neck of the ball and houses the shaft, 14. The tube is hitched to the machine to be driven in some manner and the tractive force is communicated to the machine through the member, 10, the housing, 16, the socket, the ball and the tube.

The ball and socket joint permits free angular movement in any direction within certain limits of the tube, 43, with respect to the tractor. This is desirable when certain machines are driven, for the driven machine may readily conform to changes in the direction of the tractor and adapt itself to irregularities of the ground over which it travels. With certain other machines, however, it is desired that the tube be held against rotating and the present invention comprises means whereby this may be done.

As shown in Figure 1, the ball is provided with a slot or slots, 44, and the socket has plungers, 45, adapted to be projected into the slots of the ball or withdrawn therefrom. The socket has channels extending therethrough in which the plungers are moved. The outlets of the channels are preferably closed by plates, 46, and the plungers are provided with rods, 47, which extend through perforations in the plates. The projecting ends of the rods have transverse pins, 48, which are guided in slots, 49, formed in angular members, 50, bolted to the exterior of the socket. The pins serve as pivots for cams, 51, equipped with hand operated levers, 52. The cams are held in engagement with the exterior of the plates by means such as coil springs, 53, which encircle the rods and bear against the plungers and the undersides of the plates.

In order to move the plungers, it is only necessary to operate the levers, 52, which causes the cams, 51, to move the pins, 48, in the slots of the guides, 50, and thus move the plungers into or out of the slots in the ball. Figure 2 shows the position of the levers when the plungers are in the slots and Figure 3 shows the position when the plungers are withdrawn from the slots. In Figure 1 both plungers are shown projected into their slots and the ball is held against rotatable movement around the horizontal longitudinal axis. While the mechanism is shown as provided with two plungers, any number may, of course, be employed. When the plungers are projected into the slots, they serve to prevent the ball from rotating around its longitudinal horizontal axis and thus prevent the tube 43 from rotating. They do permit some rotation of the ball around its transverse horizontal axis, so that there is some vertical angular play in the connection of the tube to the tractor. Mechanical devices other than the cams for operating the plungers will readily suggest themselves.

The mechanism under consideration also involves a means whereby the tube may be rotated to various positions and held in these positions.

This permits the tractor to drive the machine to which it is hitched with the latter at different inclined positions. This will be found advantageous in the case of certain machines, such as the plow. The angle of the driven machine may be adjusted in the present invention by inserting the plungers, 45, in the slots of the ball, 39, and rotating the socket to different positions with respect to the housing, 16, and holding it at these positions. The rotation of the socket causes rotation of the ball and consequently of the tube, 43. The tongue and groove connection between the socket and the housing, 16, permits this rotation. Manual means are used whereby the socket may be rotated relative to the housing and held in different positions.

As best shown in Figure 4, a handle, 54, is rigidly attached, as by bolts, 55, to the top of the socket. A rod, 56, extends through the handle and into engagement with notches, 57, in the periphery of the flange, 38, of the housing, 16. The rod is urged downward by a spring, 58, coiled around it, as shown in Figure 1. When engaging in a notch the rod holds the socket rigid with respect to the housing, but it may be withdrawn to permit the socket to be rotated to different positions with respect to the housing. The upper end of the rod is attached to a bell-crank lever, 59, which is pivoted to the handle, 54. When the handle and the bell-crank are grasped in the hand and squeezed the rod is lifted out of engagement with its notch and the handle may be turned to rotate the socket to different positions. The socket is thus adapted to assume various fixed positions with respect to the housing corresponding to the notches on the flange.

The operation and use of the mechanism will be more or less apparent from the above description of its construction. It is universal in its nature and may be used with tractor-driven machines of all sorts. In use, the end of the tube, 43, is attached to the machine to be drawn and the tractive pull is communicated to it from the tractor member, 10, through the housing, 16, the ball member, and socket joint, and the tube. If the mechanism is employed only as a hitching or force transmitting means, then the clutch will be thrown to disconnect the shafts, 12 and 14. If, however, the machine to which the tractor is hitched carries power-driven apparatus, the power may be derived from the motive power of the tractor by throwing the clutch to connect the shafts, 12 and 14. In fact, the mechanism provides a means whereby the power of the tractor may be utilized for any purpose whatsoever. The universal joint, 15, is relieved from all longitudinal strain to which the shaft, 14, might possibly be subjected in operation by the abutment, 42, which takes up such strain. With many machines, the plungers, 45, will be withdrawn from the slots in the ball to permit free movement of the ball within its socket and to provide a flexible connection between the tractor and the machine it draws. With other machines, such as the plow, the plungers will be inserted in the slots so that the machine will be driven at a fixed angle of incline. This angle may be varied by rotating the socket to various positions by means of the handle, 54, as above described.

While the plungers, 45, and the handle, 54, perform a useful function, they may be omitted, in which case the mechanism shown in Figure 7 results. This mechanism, however, does not provide any means for drawing machines while maintaining them at a fixed angle of incline nor for changing this angle, and consequently is not capable of the universal use that the mechanism shown in Figures 1 to 6 is. Nevertheless it is capable of use in the form shown with a good many machines wherein the functions performed by the eliminated elements are not desired, and it is to be understood that it is within the scope of the present invention.

A somewhat different modification of the invention is disclosed in Figures 8 to 10, to which reference will now be had. This form of the invention provides a mechanism in which the force transmitting means is in the form of a harness. In this modification, the clutch housing forms part of the socket for the ball through which the power transmitting means pass. The housing has an inwardly directed flange, 60, serving as a seat for the ball. A member, 61, is bolted to the housing to complete the socket structure and to hold the ball in place. The exterior of the housing has a circular flange, 62, which extends into a groove in a ring-shaped member which encircles it. The ring-shaped member is preferably composed of two parts, 63 and 64, rigidly bolted together, which may, however, be taken apart to permit disassembly of the ring from the housing. The ring is thus associated with the housing by a tongue and groove arrangement which allows it to be rotated with respect thereto. The part, 63, of the ring has a transverse piece, 65, shown best in Figure 9, to which bars, 66, are attached through members 68. The bars act as traces of a harness and are adapted to be attached to the machine to be driven to transmit the motion of the tractor thereto. The means for rotating the ring and for maintaining it at different positions so as to drive the machine at different angles of incline are substantially the same as those employed in the first modification of the invention and embody a handle associated with the ring and a rod adapted to be projected into, or withdrawn from notches on the periphery of the flange, 62.

In the above mechanism, the bars, 66, are pivotally attached to the transverse member, 65, in such a way for instance by an intermediate member 68 having forked ends at right angles to each other, so that they are allowed angular movement horizontally, and vertically but not rotationally. In other words, each bar 66 is attached to transverse member 65 through a universal joint. Thus, when the transverse member is tilted due to the ring being rotated to different positions, the bars cause a tilting of the machine to which they are connected and therefore are adapted to drive the machine at various fixed angles of incline. This form of the invention is found particularly suited for driving machines at fixed inclined angles, although by eliminating the handle, the rod and the notches on the flange, 62, a connection results which permits free angular motion of the machine with respect to the tractor.

The mechanisms which have been specifically described above are to be considered as illustrative only and many variations and alterations may be made therein without departing from the spirit and the scope of the invention.

This application is a continuation of my co-pending application, Serial No. 144,388, filed October 26, 1926.

I claim:

1. In a mechanism of the class described, a drive shaft, a driven shaft, said driven shaft having a universal joint, a housing for said joint, a clutch for connecting said drive and driven shafts, a housing for said clutch, said housings communicating with each other to form a single chamber, a bearing for the drive shaft, said clutch being located between said bearing and said universal joint, and means exterior to said housings for securing the housings to each other.

2. In a mechanism of the class described, a drive shaft, a driven shaft, said driven shaft having a universal joint, a housing for said joint, a clutch for connecting said drive and driven shafts, a housing for said clutch, a bearing for the drive shaft, said clutch being located between said bearing and said universal joint, means exterior to said housings for securing the housings to each other, and means on the driven shaft for transmitting longitudinal thrusts from said driven shaft to said housings.

3. In a mechanism of the class described, a drive shaft, a driven shaft, said driven shaft having a universal joint, a housing for said joint, a clutch for connecting said drive and driven shafts, a housing for said clutch, means exterior to said housings for securing the housings to each other, and means for selectively locking one of said housings in a plurality of positions relative to the other housing.

4. In a mechanism of the class described, a drive shaft, a driven shaft, said driven shaft being provided with a universal joint, a clutch between said drive shaft and driven shaft, housings for said universal joint, clutch and drive shaft, said housings being connected together for transmission of force therethrough and forming communicating chambers, means comprising a lever fixedly attached to said universal joint housing, for relatively adjusting said housings angularly, and a bearing in the drive shaft housing for the drive shaft.

5. In a mechanism of the class described, a drive shaft, a driven shaft, said driven shaft being provided with a universal joint, a clutch between said drive shaft and driven shaft, housings for said universal joint, clutch and drive shaft, said housings being connected together for transmission of force therethrough and forming communicating chambers, a bearing in the drive shaft housing for the drive shaft, a hollow ball-like member in the universal joint house within which the joint is disposed, said member having a tube-like portion enclosing portion of the driven shaft, and means providing a thrust engagement between the driven shaft and tube-like portion for absorbing longitudinal strain on said shaft.

6. In a mechanism of the class described, a shaft having a universal joint, a draft member comprising a housing for said shaft permitting full operation of said universal joint, a portion of said housing extending to one side of said universal joint, a second portion of said housing extending to the opposite side of said universal joint, and means for adjusting said first and second portions of said housing circumferentially with respect to each other.

7. In a mechanism of the class described, a draft member, said draft member having a stationary portion and a movable portion, means on said stationary and movable portions permitting relative angular movement in all directions between said stationary and movable portions, and means on said stationary and movable portions for preventing relative rotational movement therebetween without affecting said angular movements.

8. In a mechanism of the class described, a draft member, said draft member having a stationary portion and a movable portion, means on said stationary and movable portions permitting relative angular movement in all directions between said stationary and movable portions, and means on said stationary and movable portions for preventing relative rotational movement therebetween, said means including means for rotationally adjusting said stationary and movable portions relative to each other.

9. In a mechanism of the class described, a draft member adapted to be interposed between a tractor and its load, a universal joint in said draft member, means for attaching said draft member to a tractor to adapt the load end of said draft member to hold said load against rotation about its longitudinal axis, and means for rotationally adjusting the load end of said draft member with respect to the tractor end to rotationally adjust said load about its longitudinal axis.

10. In a mechanism of the class described a power shaft having a universal joint therein, a draft member comprising a housing about said shaft, a universal joint in said housing positioned with respect to the universal joint of said power shaft to permit full operation of the latter, each universal joint including means to prevent relative rotation between the parts connected thereby about their longitudinal axes while permitting angular movements between said parts in all directions, said draft member being adapted to be attached between a tractor and a load for drawing said load and for holding said load against angular movement about its longitudinal axis, said power shaft being adapted to transmit rotary movement from said tractor to said load.

11. In a mechanism of the class described a power shaft having a universal joint therein, a draft member comprising a housing about said shaft, a universal joint in said housing positioned with respect to the universal joint of said power shaft to permit full operation of the latter, said draft member being adapted to be attached between a tractor and a load for drawing said load, means for holding said load against angular movement about its longitudinal axis, said power shaft being adapted to deliver a rotary movement from said tractor to said load, and means for rotationally adjusting said housing to adjust said load about its longitudinal axis.

12. A draft member comprising two portions connected by a universal joint, means to prevent relative rotary motion between said two portions while permitting angular movement between said two portions in all directions, and means at said universal joint for relative rotational adjustment of said portions with respect to each other.

GUY MORGAN.